United States Patent
Gleu

(10) Patent No.: US 11,760,146 B2
(45) Date of Patent: Sep. 19, 2023

(54) PRESSURE BODY FOR A COMPRESSED-AIR SYSTEM

(71) Applicant: Continental Teves AG & Co. OHG, Frankfurt (DE)

(72) Inventor: Jens-Uwe Gleu, Langenhagen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 539 days.

(21) Appl. No.: 16/793,416

(22) Filed: Feb. 18, 2020

(65) Prior Publication Data

US 2020/0182263 A1 Jun. 11, 2020

Related U.S. Application Data

(63) Continuation of application No. PCT/EP2018/076951, filed on Oct. 4, 2018.

(30) Foreign Application Priority Data

Oct. 4, 2017 (DE) .................... 10 2017 217 618.0

(51) Int. Cl.
*B60G 11/27* (2006.01)
*B60G 11/30* (2006.01)

(52) U.S. Cl.
CPC .............. *B60G 11/27* (2013.01); *B60G 11/30* (2013.01); *B60G 2202/152* (2013.01)

(58) Field of Classification Search
CPC . B60G 11/27; B60G 2202/152; F16F 9/0418; F16F 9/0409; F16F 9/0427
See application file for complete search history.

(56) References Cited

U.S. PATENT DOCUMENTS

| | | | |
|---|---|---|---|
| 3,598,155 A * | 8/1971 | Burkley | F16F 9/0409 138/119 |
| 5,180,146 A | 1/1993 | Schneider et al. | |
| 6,250,613 B1 * | 6/2001 | Koeske | B60G 11/28 267/292 |
| 10,302,167 B2 * | 5/2019 | ten Broeke | F16F 9/057 |
| 10,703,158 B2 | 7/2020 | Pielock et al. | |
| 2006/0226586 A1 * | 10/2006 | Levy | B60G 11/28 267/64.27 |

(Continued)

FOREIGN PATENT DOCUMENTS

| | | |
|---|---|---|
| CN | 202301700 U | 7/2012 |
| CN | 105365515 A | 3/2016 |

(Continued)

OTHER PUBLICATIONS

Makoto Ienaka, Air Spring and Its Manufacture, Jun. 15, 1993, EPO, JP 5/149363 A, Machine Translation of Description (Year: 1993).*

(Continued)

*Primary Examiner* — James A English

(57) ABSTRACT

Pressure body for an air-spring system, which is produced from a plastics material, wherein the pressure body comprises an outer enveloping structure and an internal reinforcing structure, wherein the enveloping structure comprises a multiplicity of convexly shaped segments, which are arranged adjacent to one another and form part of a wall of the pressure body.

18 Claims, 3 Drawing Sheets

(56) References Cited

U.S. PATENT DOCUMENTS

| | | |
|---|---|---|
| 2008/0211150 A1* | 9/2008 | Levy ................. F16F 9/057 92/92 |
| 2012/0248667 A1 | 10/2012 | Leonard |
| 2014/0239606 A1 | 8/2014 | Koeske et al. |
| 2017/0151848 A1* | 6/2017 | Delorenzis ............. B60G 11/27 |
| 2017/0204928 A1* | 7/2017 | Dehlwes ............... F16F 9/0454 |
| 2018/0009280 A1 | 1/2018 | Siefermann et al. |
| 2018/0015800 A1 | 1/2018 | Derr et al. |
| 2018/0297431 A1* | 10/2018 | Leonard ............ B60G 17/0521 |

FOREIGN PATENT DOCUMENTS

| | | |
|---|---|---|
| DE | 102012012902 A1 | 1/2013 |
| DE | 112012002716 T5 | 3/2014 |
| DE | 102015100281 A1 | 7/2016 |
| DE | 102016205741 A1 | 10/2017 |
| DE | 102016112307 A1 | 1/2018 |
| EP | 0446476 A1 | 9/1991 |
| EP | 2846061 A1 | 3/2015 |
| JP | 5149363 A * | 6/1993 ............... F16F 9/04 |
| WO | 01/61207 A1 | 8/2001 |
| WO | 2016/086201 A1 | 6/2016 |
| WO | 2016/110357 A1 | 7/2016 |
| WO | 2016/183067 A1 | 11/2016 |
| WO | 2017/004472 A1 | 1/2017 |

OTHER PUBLICATIONS

Search Report dated May 27, 2019 from corresponding German Patent Application No. DE 10 2018 216 989.6.

International Search Report and Written Opinion dated Feb. 12, 2019 from corresponding International Patent Application No. PCT/EP2018/076951.

Search Report dated Jun. 9, 2019 from corresponding German Patent Application No. DE 10 2018 216 992.6.

* cited by examiner

PRESSURE BODY FOR A COMPRESSED-AIR SYSTEM

CROSS REFERENCE TO RELATED APPLICATIONS

This application is the U.S. national phase application of PCT International Application No. PCT/EP2018/076951, filed Oct. 4, 2018, which claims priority to German Patent Application No. DE 10 2017 217 618.0, filed Oct. 4, 2017, wherein the contents of such applications are incorporated herein by reference.

TECHNICAL BACKGROUND

DE 10 2016112 307 A1 has disclosed a pressure vessel in the form of an air spring cover for an air suspension system. This pressure vessel comprises a hollow main body, which has an internal volume. An opening, into which an additional body can be inserted, is provided in the circumferential wall of the main body. To enable the volume of the pressure vessel to be varied, the position of the additional body in the main body can be changed. Depending on the position in which the additional body is secured in the main body, a certain volume is specified. It is thus possible to obtain air spring covers of different volumes in production, using the same component.

As is known, an air spring cover of this kind is used in an air suspension strut of the kind known from DE 10 2012 012 902 A1, for example.

In addition, a wide range of requirements is placed on the air spring cover of an air suspension strut:
a) closure of the pressure-tight interior of the air spring,
b) attachment of the entire air suspension strut to the chassis,
c) provision of part of the air spring's internal volume that acts as a spring, and
d) secure and pressure-tight location of other attachments.

In order to allow the pressure-tight closure of the air spring, the air spring cover must provide the clamping base for the rolling bellows, to which the rolling bellows is attached in a sufficiently firm and pressure-tight manner. Moreover, the air spring cover itself must ensure pressure-tight and firm attachment to the motor vehicle body and make available pressure-tight and secure receptacles for other attachments, e.g. air connection, additional volume, damper bearing, residual pressure holding valve.

The forces acting on the air spring cover of an air suspension strut arise through the internally pressurizing gas force of the spring-effective cover chamber, which gas force, as a result of the variable pressure, can be divided into static and dynamic fractions. Moreover, dynamic compressive and tensile forces, which are dependent on the spring rate, act on the air spring cover at the attachment point of the shock damper (damper bearing). These arise as forces that limit outward deflection by way of the tension stop of the shock damper in the damper bearing housing of the air spring cover.

To make available the air spring volume with the spring action, the air spring cover must be matched as well as possible to the available installation space on the chassis or axle side of the air spring in order in this way to provide the required amount of volume by means of its outer envelope. For a maximum internal volume of the air spring once the external shape is fixed, the internal shape of the air spring cover should correspond as far as possible to the external shape. This means that a spring cover provides more volume, the more it adaptively matches the available installation space in the chassis, on the one hand, and the smaller the wall thicknesses it has, on the other, while still meeting the strength requirements.

However, contrary measures are required for the optimum satisfaction of requirements a) to c) on the air spring cover. For this reason, a compromise between strength, volume and producibility must be found in the design of the air spring.

As regards producibility, the selected production and connection methods, such as sheet metal forming, (injection) molding or machining in combination with, for example, screwing, adhesive bonding or welding, limit, in particular, the adaptability of the cover geometry which is still economically acceptable. On the other hand, the selected materials limit the possible wall thicknesses that still allow strength and pressure-tightness to be ensured.

The forces which arise within the air spring cover tend to inflate the latter like a balloon, whereas the tensile and compressive forces of the shock damper which are passed through act in a direct line between the bottom of the damper bearing housing and the screw attachment points of the cover on the chassis or on the axle. Thus, there are two fundamentally different support mechanisms for these two types of load.

The forces of the internal pressure are absorbed by the diaphragm effect of the enveloping structure of the air spring cover (component parts that are arranged within the air spring cover but are not subject to a pressure difference are not involved in this), and the additional spring or damper bearing forces that are passed through act along the shortest lines connecting the intermediate plate of the damper bearing housing and the chassis-side fastening points and are ideally transmitted via tension/compression rods.

It is known that the supporting action of a diaphragm is based on the local curvature of a surface, with the result that lower material loads arise when the supporting diaphragm surface is formed with smaller radii of curvature. In contrast, lower material loads arise in the case of tension/compression rods if the underlying structure follows the line of action of the force in as rectilinear a manner as possible. The minimal loading which then remains from the point of view of structural mechanics must be absorbed by an appropriate material cross section.

If a cover structure deviates from these design principles, e.g. if the enveloping structure does not have a uniformly curved shape with small radii but a shape with corners or indentations or the like, for example, or is simply purely cylindrical (curvature in only one direction), flat (no curvature) or oval (highly variable curvature), or the tension/compression rods do not point in a straight line from the intermediate plate of the damper bearing housing to the screw attachment points on the chassis (or on the axle) but are instead curved, for example, then it is necessary in the planning process to compensate each deviation from this design principle by a corresponding additional use of material because, owing to the deviation from the minimum possible material load, the additional material load which subsequently occurs must be compensated.

What is needed is to provide a pressure body for a compressed-air system which, while having a weight which is as low as possible, has an optimum strength and encompasses a pressure volume which is as large as possible.

DETAILED DESCRIPTION OF THE DRAWINGS

Figure 1:
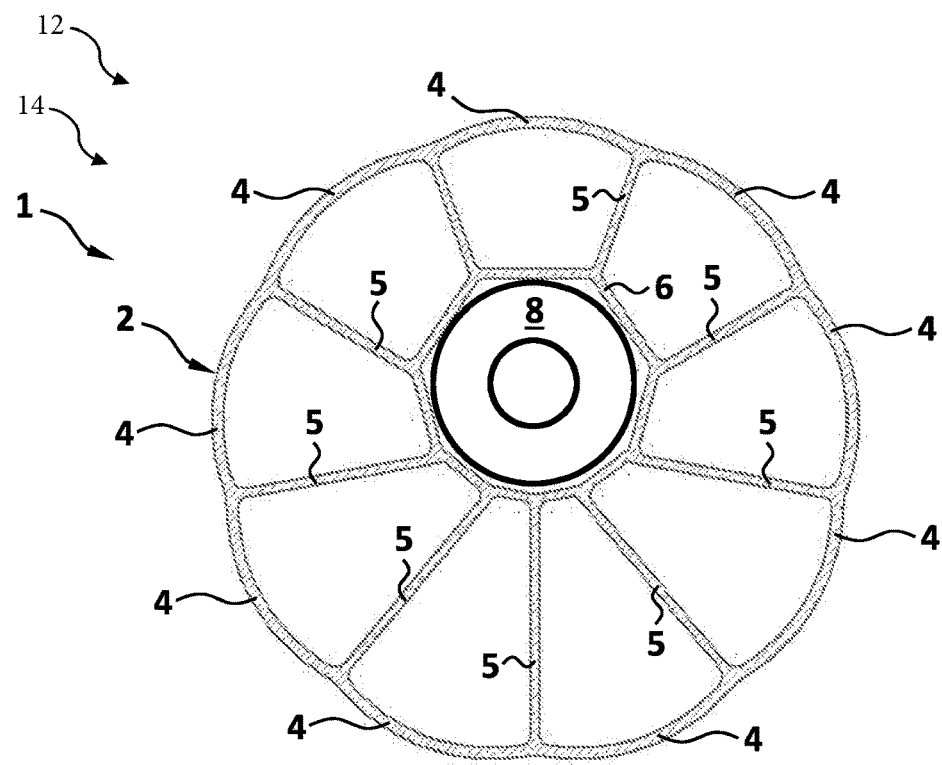
FIG. 1 shows a first illustrative pressure body in cross section.

A pressure body for a compressed-air system of a motor vehicle, which is produced from a plastics material, is provided, wherein the pressure body comprises an outer enveloping structure and an internal reinforcing structure, wherein the enveloping structure comprises a multiplicity of convexly shaped segments, which are arranged adjacent to one another and form part of a wall of the pressure body.

The segmentation of part of a wall of the pressure body into a multiplicity of convexly shaped segments creates a pressure body which, while having a low wall thickness, can nevertheless withstand high internal pressures. In this context, segments are interpreted to mean those subsections or subregions of a part of the wall of the pressure body which are distinguished by their special shaping. In a cross section of a segment, the special shaping may be regarded as convex. That is to say that it is arched or rounded outward. At least part of the wall of the pressure body is formed by juxtaposing a plurality of arched segments.

The embodiments aim to allow a reduction of the load on components in the context of the use of plastics materials and production processes associated therewith. Shaping by means of segments of the enveloping structure exploits the possibilities of production methods such as injection molding and welding more effectively and lowers production costs.

According to at least one embodiment, the wall formed by the segments is formed in the circumferential direction around the longitudinal axis of the pressure body. It can be regarded as a circumferential wall. The envelope of the pressure body is formed primarily by the segmented wall.

The pressure body comprises a first and a second half-shell, wherein the pressure body is assembled from the two half-shells. The wall of at least one half-shell or, alternatively, the other half-shell is formed by the segmented enveloping structure. In this case, the first and the second half-shell can be open at the top and/or at the bottom and can be closed by means of other geometrical shapes. That is to say that one half-shell is covered by means of a plate, for example. It is also possible for one half-shell to form a region of attachment for another component, which is connected in a pressure-tight manner to the region of attachment.

According to another embodiment, the reinforcing structure comprises at least a multiplicity of inward-directed reinforcing ribs and at least one reinforcing element. The specified enveloping structure and the reinforcing structure lower the specific material stress, and therefore there is a saving of material and an increase in the bursting strength of the pressure body. Moreover, the component weight is significantly reduced.

The reinforcing element is an encircling polygon and comprises straight elements or struts, which are connected to one another.

The reinforcing ribs are each connected at one end to the inside of the wall and at the other end to the reinforcing element. The reinforcing structure is thereby connected to the enveloping structure and produced from the same plastics material. The reinforcing ribs engage on the corners of the polygonally shaped reinforcing element.

The reinforcing ribs and the reinforcing element are molded from the plastics material of one half-shell. In addition, the other half-shell likewise has reinforcing ribs, which form an extension of the reinforcing ribs of the other half-shell. In terms of manufacture, it is advantageous to produce the reinforcing element from just one of the half-shells.

As an option, the reinforcing ribs are each attached in a region of connection of one segment to an adjacent segment. As viewed in cross section, the curvature of one segment intersects the curvature of an adjacent segment. The region of connection of one segment to the adjacent segment lies at this point of intersection of the lines of curvature. In the region of connection, the material stress in the wall converges and is introduced into the reinforcing rib. This represents a tension rod for the stresses and can absorb these stresses in an advantageous manner.

The segments are connected to one another via the region of connection, or the segments are connected to one another in direct juxtaposition.

According to another embodiment, the radius of a convexly shaped segment is smaller than the outer radius of the enveloping structure. The radius of the convexly shaped segments should always be dimensioned in such a way that it is smaller than the outer radius of the maximum possible outside diameter of the enveloping structure. By virtue of this geometric configuration, it is possible to obtain a multiplicity of convexly shaped segments by means of the wall of the pressure body.

According to another embodiment, the pressure body is an air spring cover of an air suspension strut. A segmented air spring cover of this kind reduces the total weight of the air suspension strut and simultaneously enlarges the volume with a spring action. This is because the type of segmentation allows smaller wall thicknesses, thereby making possible a larger internal volume with the same outside diameter.

An air spring cover of this kind is furthermore tailor-made for mass production by virtue of the simplified production method involving the plastics injection molding and welding processes. This assists with standardization processes in production series since the subcomponents of the cover (e.g. upper shell, lower shell, reinforcing insert, supporting ring) can be designed in a way which is mutually compatible and allows modular interchangeability, depending on the requirements of the application. The variability of the adaptation of the cover to different installation spaces (protrusions, corners, oval shapes, both in the radial or the axial direction) is enhanced or made possible in a way which was previously impossible or uneconomic. Moreover, the integration of air chambers and switching valves is made easier by the mode of construction shown.

In addition, one half-shell comprises a clamping base for attaching the rolling bellows of the air suspension strut. Meanwhile, the other half-shell is provided for the purpose of receiving a damper bearing housing.

According to another embodiment, the pressure body is an additional accumulator connected to an air suspension strut. The conventional additional accumulators connected directly to the air suspension strut can likewise be implemented as per the segmented pressure body. They are suitable especially by virtue of their low weight and enlarged volume.

According to another embodiment, the pressure body is a compressed-air accumulator of a compressed-air system. The compressed-air system is an air suspension system or an air brake system. In general, these systems include air accumulators/pressure accumulators in which compressed air is stored. Consequently, the pressure accumulator of an air suspension system or of an air brake system can also be embodied as per the segmented pressure body and likewise has the advantages already mentioned.

The pressure body is used in a compressed-air system for a motor vehicle.

A first illustrative pressure body 1 for a suspension strut 14 of an air suspension system 12 is illustrated in cross section in FIG. 1. The pressure body is made up of a first half-shell 2 and a second half-shell. FIG. 1 shows only the first half-shell 2 in section.

The pressure body 1, which is produced from a plastics material, or the first half-shell 2 thereof comprises an outer enveloping structure and an internal reinforcing structure. The outer enveloping structure is formed at least by the outer wall of the first half-shell 2. Of course, however, it is also formed by the outer wall of the second half-shell, which is not shown.

In order to provide a pressure body with a wall thickness which is as small as possible and an internal volume which is as large as possible and which simultaneously withstands high internal pressures, the enveloping structure is divided into a multiplicity of convexly shaped segments 4. The convexly shaped segments 4 of the outer enveloping structure or wall form curves in the pressure body envelope or also diaphragm envelope, and these are supported on the internal reinforcing ribs 5.

The internal reinforcing structure is formed at least by the multiplicity of reinforcing ribs 5 and by a reinforcing element 6. Introducing the reinforcing ribs 5 allows an enveloping structure with curves which withstands the stresses in the material and the internal pressure in the pressure body 1. The reinforcing ribs 5 additionally offer a radially aligned supporting effect. As a result, the envelope no longer has to be circular in shape but can have additional curves.

More specifically, a cross section with a multiplicity of convexly shaped segments 4 has now been devised instead of a circular, elliptical or cylindrical cross section of the pressure body envelope. Each segment 4 comprises a radius which is smaller than the radius of the pressure body envelope resulting from the outside diameter of said envelope. Segments 4 are juxtaposed and are, of course, molded from the plastics material of the first half-shell 2 and also from the second half-shell. A reinforcing rib 5 starts on the inside at the point of intersection of a segment 4 with an adjacent segment 4. Reinforcing ribs 5 converge radially into the interior of the first half-shell 2 to form the reinforcing element 6. Reinforcing element 6 thus forms the central anchorage point for all the reinforcing ribs 5, which extend inward from the points of intersection of the segments 4. Like the reinforcing ribs 5, reinforcing element 6 is molded from the plastics material of the first half-shell 2.

To enable a damper bearing receptacle 8 to be received as an air spring cover in the illustrative pressure body 1 in FIG. 1, reinforcing element 6 is provided. This polygonally shaped reinforcing element 6 provides for the missing attachment of the reinforcing ribs 5, which usually end at the wall of a pot-shaped damper bearing receptacle. As a shape for the internal structure, a form comprising one or more circular arcs is not expedient for the reinforcing element 6 since only tensile stresses arise in the reinforcing element 6 in the support of the stresses in the reinforcing ribs 5. This is therefore designed as a polygon.

Figure 2:
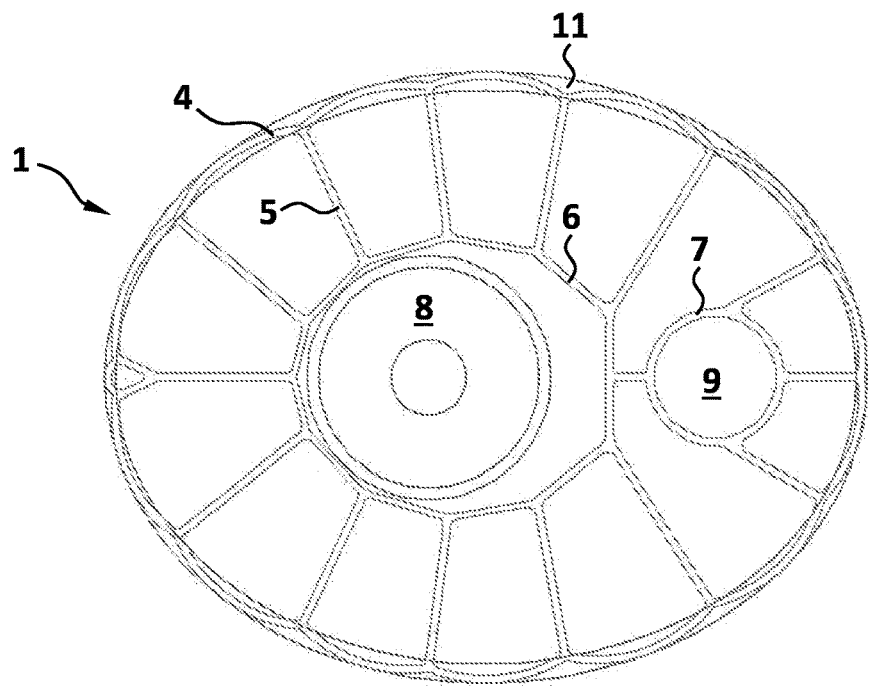
FIG. 2 shows a second illustrative pressure body in cross section.

FIG. 2 shows a second illustrative pressure body 1 in cross section.

In addition to reinforcing element 6 for damper bearing receptacle 8, this comprises an additional ring 7, in which an air connection 9 can be positioned. Incidentally, 11 indicates the normal cross section of an air spring cover in order to better illustrate the curvature of the convex segments 4. In FIG. 2, just one segment 4 and just one reinforcing rib 5 are provided with a reference sign in each case, as representative examples.

In this modification, variable segment pitch angles, segment curvatures and reinforcing ribs 5 are combined in order to allow better adaptation to the outer contour and to enable components such as the air connection 9 to be accommodated. All this serves to save materials.

With each additional segment 4, the diaphragm load in the reinforcing ribs 5 decreases, whereas the use of material for the reinforcing ribs 5 rises with the number thereof. Above a certain number of segments 4 in the pressure body envelope, it may therefore be the case that it is no longer expedient to support each segment piece 4 by a dedicated reinforcing rib 5. In addition, there is the fact that, for production reasons, it is often not possible to go below a minimum wall thickness in the case of the reinforcing ribs 5 too. It is then expedient, for example, to combine the support of a plurality of reinforcing ribs 5 in a Y-shaped manner or in a fan shape into a common reinforcing rib 5 before said rib is connected to the internal supporting structure (reinforcing element 6), as can be seen in FIG. 2.

These developments can be arranged in series in a cascade and combined with one another. By way of example, different curvatures can be selected for the segments 4, in particular in order to better match the combination of reinforcing ribs 5 of individual segments 4 or a non-circular outer contour of the pressure body envelope or in order to integrate other functional elements (air connection 9).

According to the example, the reinforcing ribs 5 are in each case of rectilinear design and oriented in the direction of the tensile stress of the diaphragm envelope. The stressing of the reinforcing ribs 5 is thereby reduced and, in addition, material is saved.

Figure 3:
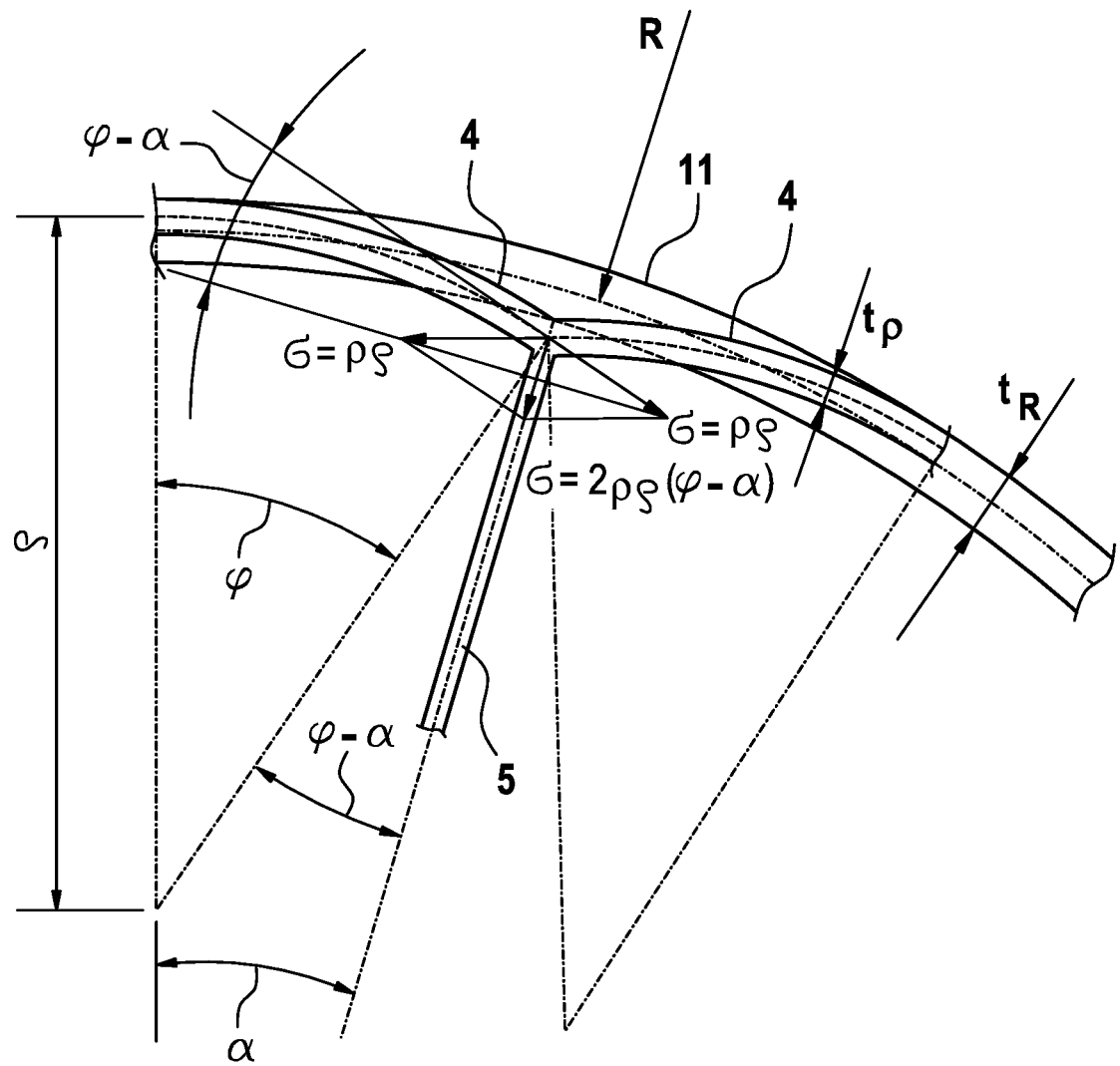
FIG. 3 shows force paths and radii of the enveloping structure.

FIG. 3 illustrates the design principle of the enveloping structure of a pressure body according to the example.

In general, the enveloping structure of pressure bodies for compressed-air systems is cylindrically shaped in cross section. This can be seen at 11. The circular external structure of a pressure body defines a maximum possible outside diameter of the enveloping structure depending on the available installation space.

The decisive geometry of the pressure body envelope is determined by the radius R and the wall thickness $t_R$. By means of the convex segments 4 arranged in series, having a relatively small radius of curvature $r$, where $r < R$, and a relatively small wall thickness $t^r$, where $t^r < t_R$, the illustrative enveloping structure is achieved. The advantage of such shaping consists in that, with relatively small local radii of curvature $r$ of the enveloping structure, the stresses σ also decrease and smaller wall thicknesses $t^r < t_R$ are sufficient overall.

Normally, the wall thickness would increase, i.e. would become thicker, with a larger diameter or larger radius of the pressure body envelope. With an increasing outside diameter, the wall thickness of the pressure body envelope will also increase proportionally at the same time in order to keep the stresses in the material constant at the same internal pressure load, thereby ensuring that the stresses in the material do not exceed the strength of the material.

The illustrative approach with a multiplicity of steeply curved segments 4 with a thin wall thickness and support by reinforcing ribs 5 can be continued as desired until the envelope has been relieved to such an extent by the juxtaposition of ever further segments 4 that the remaining required wall thickness of the pressure body envelope goes below its minimum producible wall thickness (e.g. $t$ min=2 mm) because this is physically limited due to flow properties of the material during injection molding.

Figure 4:
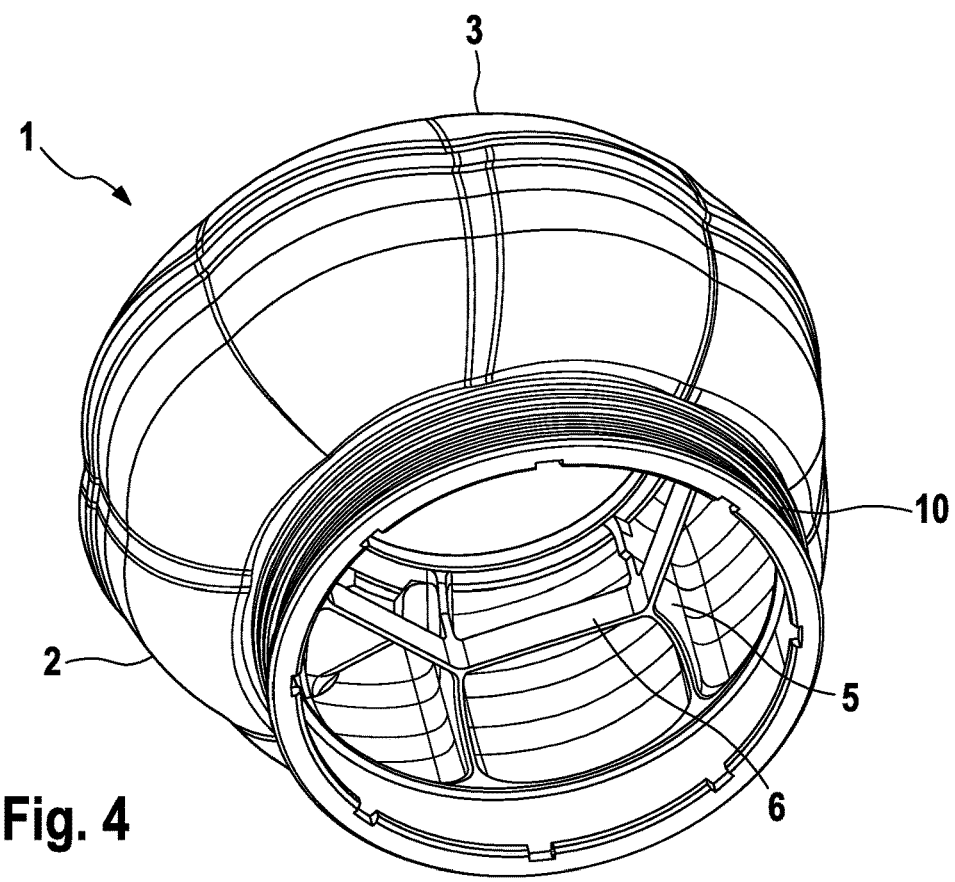
FIG. 4 shows an illustrative pressure body as an air spring cover in a perspective view.

FIG. 4 shows a pressure body 1 in the form of an air spring cover for an air suspension strut in a perspective view from below.

Pressure body 1 comprises the first half-shell 2 and the second half-shell 3. A clamping base 10 for the attachment of an upper end of a rolling bellows is provided on the underside of the first half-shell 2.

The outer enveloping structure of the pressure body 1 as an air spring cover is embodied by the illustrative convex segments 4. The internal reinforcing structure is formed by the reinforcing ribs 5 and the reinforcing element 6. In the embodiment shown, reinforcing element 6 is molded from the plastics material of the first half-shell 2. The internal reinforcing structure allows extended shaping and the half-shells 2 and 3.

A thermoplastic is used as a plastics material for the half-shells 2 and 3. The choice of material is determined by the specific strength requirements on the respective cover part and by the joining method for connection.

Thus, it is also possible for different thermoplastics to be used for the half-shells 2 and 3, in particular materials with a similar melting point but different fiber filling, e.g. PA6GF30 and PA6.6GF50. These materials are good for welding and better match the specific requirements. As an alternative, it is also possible to use thermoplastics for one half-shell and thermosets for the other half-shell.

In order to match the design principle involving the mechanics of a diaphragm, the outer wall of the air spring cover is manufactured in a thin-walled form. It has an outer structural shape distinguished by uniform curvature in order in this way to be able to withstand the internal pressure while having a material thickness which is as small as possible. The outer wall incorporates the functional interfaces of the air spring cover. These are, for example, the damper bearing housing, snap ring seats or threads for fastening a closure cover of the damper bearing housing, the geometry of the clamping contour for connection to the rolling bellows, molded elements for the attachment of the bellows as required, openings for the connection of a pneumatic additional element (additional volume, air connection, residual pressure holding valve) according to requirements.

The introduction of vertically extending reinforcing ribs 5 leads to an enhancement of the weldability of the entire air spring cover. The first and the second half-shell 2 and 3 can be connected gas-tightly to one another by welding, adhesive bonding, positive engagement or screw fastening (the latter two options in conjunction with an O-ring seal).

First of all, the air spring cover comprising the two half-shells 2 and 3 is assembled in an additional joining process. Thermoplastic welding may be considered as a highly efficient joining process because, in addition to materially integral and firm joining of the part-shells, it simultaneously allows reliable and gas-tight sealing of the joining surface. If there is no adequate welding surface available, the welding between the cover parts will fail if the internal pressures are too high.

In the case of fiber-reinforced plastics, the specific strength of a welded joint is always lower than the strength of the undisturbed region of material. This is attributable to the lack of reinforcing fibers passing through the weld seam and therefore, by virtue of the principle involved, the strength of a weld seam can only be of the order of the strength of the polymeric base material.

Now, the basic load of the internal pressure tends to tear the upper half-shell 3 apart vertically from the lower half-shell 2. Therefore, the size of welded surface is decisive for the performance of the weld because it is only by way of the size of the surface that the lower specific weld seam strength can be compensated. As a welding surface, a cover envelope without internal ribs has available only the annular interface of the outer contour of the cover envelope in the parting plane between the upper and the lower cover part 2 and 3.

The conventional way of enlarging the welding surface here is to increase the wall thickness of the cover envelope. However, this is disadvantageous. The internal volume is lost owing to the greater wall thickness. The cover envelope requires a greater use of material, making it heavier and more expensive. Greater wall thicknesses lengthen the cycle time in the injection process and thus add to the expense of production. Moreover, greater wall thicknesses are susceptible to voids.

Local thickening toward the outside furthermore requires drawing in the cover envelope by an amount corresponding to the thickening for a given installation space, resulting in a smaller cover volume. Local thickening toward the inside gives rise to undercuts in the mold and therefore makes the production process more expensive or prevents it.

Because of these disadvantages, the approach followed is that of forming reinforcing ribs 5 with vertically oriented surfaces in the first and the second half-shell 2 and 3 which rest on one another and are welded to one another. As a result, the reinforcing ribs 5 formed from the first and the second half-shell 2 and 3 represent an enlargement of the weld seam surface and increase the strength of the air spring cover.

The illustrative design principle of the air spring cover can also be applied to other pressure bodies in a compressed-air system. Examples are pressure accumulators as reservoirs and as additional volumes that are attached to the air suspension strut and are shaped in this way.

Figure 5:
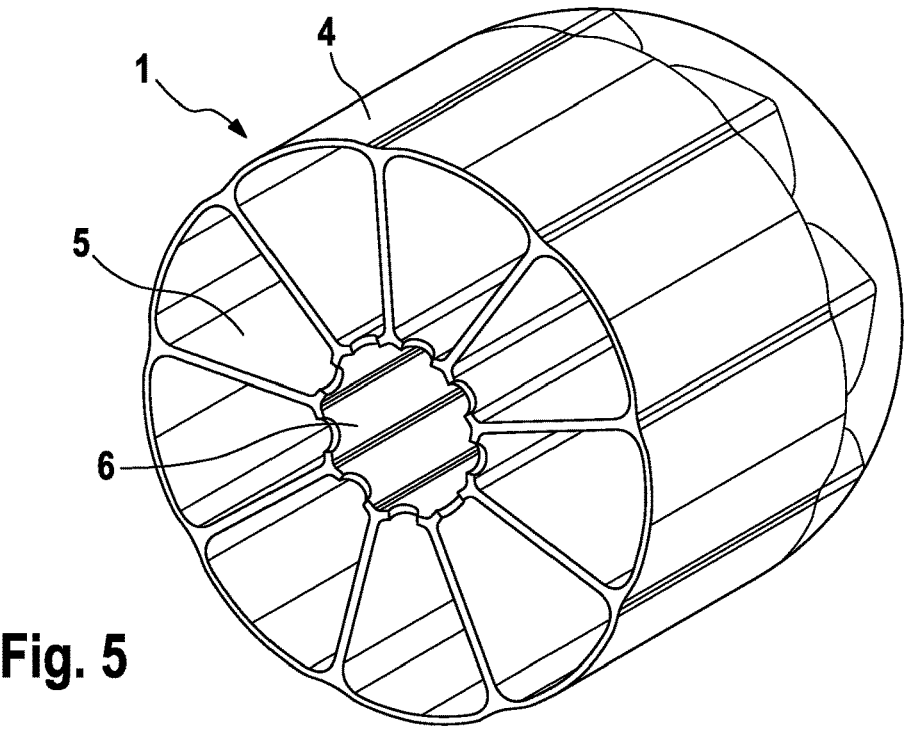
FIG. 5 shows an illustrative pressure body as a pressure accumulator in a perspective view.

An illustrative pressure body 1 as a pressure accumulator/air accumulator in a compressed-air system can be seen in perspective view and in section in FIG. 5.

The cross section through pressure body 1 illustrates the convex curvature of the segments 4 which form the circumferential wall of the pressure accumulator and also shows the reinforcing ribs 5, which converge inward to the encircling reinforcing element 6. The reference signs 4 and 5, which are used only once, represent the multiplicity of segments 4 and reinforcing ribs 5 that can be seen.

LIST OF REFERENCE SIGNS

1 Pressure accumulator
2 First half-shell
3 Second half-shell
4 Segment
5 Reinforcing rib
6 Reinforcing element
7 Additional ring
8 Damper bearing receptacle 9 Air connection
10 Clamping base
11 Cross section

The invention claimed is:

1. A pressure body for a compressed-air system of a motor vehicle, comprising:
   the pressure body is plastic and comprises an outer enveloping structure and an internal reinforcing structure;
   wherein the enveloping structure comprises a multiplicity of convexly shaped segments which are arranged adjacent to one another and form part of a wall of the pressure body; and
   wherein a radius of a convexly shaped segment is smaller than an outer radius of the enveloping structure.

2. The pressure body as claimed in claim 1, wherein the wall formed by the segments is formed in a circumferential direction around a longitudinal axis of the pressure body.

3. The pressure body as claimed in claim 1, wherein the reinforcing structure comprises at least a multiplicity of inward-directed reinforcing ribs and at least one reinforcing element.

4. The pressure body as claimed in claim 3, wherein the reinforcing ribs are each connected at one end to the inside of the wall formed by the segments and at the other end to the reinforcing element.

5. The pressure body as claimed in claim 4, wherein the reinforcing ribs are each attached in a region of connection of one segment to an adjacent segment.

6. The pressure body as claimed in claim 1, wherein the pressure body is a compressed-air accumulator of a compressed-air system.

7. An air suspension system of a motor vehicle, comprising:
   a pressure body is plastic and comprises an outer enveloping structure and an internal reinforcing structure;
   wherein the enveloping structure comprises a multiplicity of convexly shaped segments which are arranged adjacent to one another and form part of a wall of the pressure body; and
   wherein a radius of a convexly shaped segment is smaller than an outer radius of the enveloping structure.

8. The air suspension system as claimed in claim 7, wherein the wall formed by the segments is formed in a circumferential direction around a longitudinal axis of the pressure body.

9. The air suspension system as claimed in claim 7, wherein the reinforcing structure comprises at least a multiplicity of inward-directed reinforcing ribs and at least one reinforcing element.

10. The air suspension system as claimed in claim 9, wherein the reinforcing ribs are each connected at one end to the inside of the wall formed by the segments and at the other end to the reinforcing element.

11. The air suspension system as claimed in claim 10, wherein the reinforcing ribs are each attached in a region of connection of one segment to an adjacent segment.

12. The air suspension system as claimed in claim 7, wherein the pressure body is a compressed-air accumulator of a compressed-air system.

13. A suspension strut of a motor vehicle, comprising:
   a pressure body is plastic and comprises an outer enveloping structure and an internal reinforcing structure;
   wherein the enveloping structure comprises a multiplicity of convexly shaped segments which are arranged adjacent to one another and form part of a wall of the pressure body; and
   wherein a radius of a convexly shaped segment is smaller than an outer radius of the enveloping structure.

14. The suspension strut as claimed in claim 13, wherein the wall formed by the segments is formed in a circumferential direction around a longitudinal axis of the pressure body.

15. The suspension strut as claimed in claim 13, wherein the reinforcing structure comprises at least a multiplicity of inward-directed reinforcing ribs and at least one reinforcing element.

16. The suspension strut as claimed in claim 15, wherein the reinforcing ribs are each connected at one end to the inside of the wall formed by the segments and at the other end to the reinforcing element.

17. The suspension strut as claimed in claim 16, wherein the reinforcing ribs are each attached in a region of connection of one segment to an adjacent segment.

18. The suspension strut as claimed in claim 13, wherein the pressure body is a compressed-air accumulator of a compressed-air system.

* * * * *